(12) United States Patent
Moseley

(10) Patent No.: US 11,441,076 B2
(45) Date of Patent: Sep. 13, 2022

(54) FIRE RETARDANT FORMULA AND METHOD OF USE

(71) Applicant: James Eugene Moseley, Marina Del Rey, CA (US)

(72) Inventor: James Eugene Moseley, Marina Del Rey, CA (US)

( * ) Notice: Subject to any disclaimer, the term of this patent is extended or adjusted under 35 U.S.C. 154(b) by 329 days.

(21) Appl. No.: 16/825,930

(22) Filed: Mar. 20, 2020

(65) Prior Publication Data

US 2020/0299584 A1 Sep. 24, 2020

Related U.S. Application Data

(60) Provisional application No. 62/821,324, filed on Mar. 20, 2019.

(51) Int. Cl.
*C09K 21/04* (2006.01)
*C09K 21/08* (2006.01)
*C09K 21/14* (2006.01)

(52) U.S. Cl.
CPC .............. *C09K 21/04* (2013.01); *C09K 21/08* (2013.01); *C09K 21/14* (2013.01)

(58) Field of Classification Search
CPC ......... C09K 21/02; C09K 21/08; C09K 21/14
See application file for complete search history.

(56) References Cited

U.S. PATENT DOCUMENTS

2016/0222225 A1\* 8/2016 Moseley .................. C09D 7/61

\* cited by examiner

*Primary Examiner* — Peter F Godenschwager
(74) *Attorney, Agent, or Firm* — Procopio, Cory, Hargreaves & Savitch LLP

(57) ABSTRACT

A fire prevention coating formula is applied to surfaces in order to reduce and prevent the spread of fires across the applied surfaces. The homogeneous coating mixture is applied to surfaces through spraying or painting means. When heated, the fire prevention coating formula forms a thick, stable, passivating oxide layer protecting the surface from further reaction.

10 Claims, No Drawings

FIRE RETARDANT FORMULA AND METHOD OF USE

CROSS-REFERENCE TO RELATED APPLICATIONS

This application claims priority to U.S. Provisional Patent Application No. 62/821,324, filed on Mar. 20, 2019, titled "FIRE RETARDANT FORMULA AND METHOD OF USE," the disclosure of which is incorporated herein in its entirety by reference.

FIELD OF THE INVENTION

The present invention relates to novel compositions comprising a formula to keep ignition from occurring and prevent the spread of flames and smoke caused by fires, as well as methods for the application and/or prevention of fire using these compositions. This formula can be applied to prevent the spread of flames and smoke on all surfaces for seven to ten years.

BACKGROUND OF THE INVENTION

Fire can be implemented as a tool, however if uncontrolled and not desired fire can be a very destructive force of nature. Fire is the cause for the destruction of numerous buildings and personal affects, as well as, cause people and animals serious injuries and even death. Current means of fireproofing are only effective to certain levels of heat and flame exposure; however, with the advancement of heat shielding for aerospace applications, spacecraft, and other supersonic military aircraft can withstand extreme aerodynamic heating which results from re-entering the Earth's atmosphere.

The present invention is a fire prevention coating formulation to be applied to surfaces in order to prevent ignition and inhibit the spread of fire. The present invention is able to absorb and bond to wood, polymers, metals, fabrics, fiberglass and plastics. Once in contact with flames or radiant heat, this invention does not expand to protect substrates in the way intumescent paints do. Intumescent paints expand up to 100-200 times, don't absorb into the surface and create a very hard, protective barrier that creates a very arduous and costly effort in the removal of intumescent coating. Intumescent paint merely insulates the surface creating a barrier, but they don't contract once the heat dissipates to allow oxygen back into the surface like the instant formulation does. Intumescent paints can also be triggered at temperatures around 120 Celsius, far below what most surfaces would take to combust. It can be less costly to replace the beam or area treated with intumescent after flame or radiant heat has caused the expansion to take place.

The instant invention creates a nano-particle reaction within the Aluminel powder. (Aluminel term derived by the inventor through a combination of Inconnel and Alumina). After flame and radiant heat have entered the substrate, the powder expands, cutting off means of Oxygen and therefore self-extinguishing. After heat dissipates, the powder then contracts to its original form allowing surfaces like wood to again breath, which is critical to wood surfaces. The present invention also significantly reduces the volume of smoke, flames and fumes associated with fires. An additional benefit of this invention is that it acts as a natural rot and termite inhibitor when used on woods.

Provided herein are novel compositions comprising a unique formula to be applied to all surfaces to prevent ignition from occurring and prevent the spread of flames and smoke caused by fires, as well as methods for the application of these compositions.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

The descriptions of the disclosed embodiments are provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description presented herein represents a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The present invention is a fire prevention coating formulation to be applied to surfaces in order to prevent ignition and inhibit the spread of fire. The present invention is able to absorb and bond to wood, polymers, metals, fabrics, fiberglass and plastics. Once in contact with flames or radiant heat, this invention does not expand to protect substrates in the way intumescent paints do. Intumescent paints expand up to 100-200 times, don't absorb into the surface and create a very hard, protective barrier that creates a very arduous and costly effort in the removal of intumescent coating. Intumescent paint merely insulates the surface creating a barrier, but they don't contract once the heat dissipates to allow oxygen back into the surface like the instant formulation does. Intumescent paints can also be triggered at temperatures around 120 Celsius, far below what most surfaces would take to combust. It can be less costly to replace the beam or area treated with intumescent after flame or radiant heat has caused the expansion to take place.

The instant invention creates a nano-particle reaction within the powder which is a component of the formula. The powder is composed of Inconel and Alumina. After flame and radiant heat have entered the substrate surface, the powder in the formula expands, cutting off means of oxygen and therefore self-extinguishing the burning surface. This is process done through thermal expansion and contraction. The powder in the formula will expand at temperatures between 250 to 325 F and will contract when the temperature drops below 250 F. After the heat has dissipated, the powder then contracts to its original form allowing surfaces like wood to again breath, this process is critical to wood surfaces. This process can be compared to a bridge being built with metal expansion joints which expand and contract without causing faults in the overall structure of the bridge. Through the elimination of oxygen and the natural occurrence of carbonization buildup the present invention also significantly reduces the volume of smoke, flames and fumes associated with fires.

The invention's formula is applied to the surfaces by way of spraying or painting. An airless sprayer is used to apply the formula to the surface of a building, telephone pole, electricity pole or other object. The formula is applied to the trim of a building by way of painting on. The formula functions best when at least two coats are applied to the surface.

The formula and application process of the invention has been tested by multiple labs and approved by many agencies. Including the U.S. Department of Energy, Environmental Consulting, Inc., Cal Fire and Fire Testing Laboratories, Inc. The formula was tested to ASTME-2768 standards by Fire Testing Laboratories, Inc. the purpose of this test method was to evaluate the ability of a product to limit the surface spread of flame when evaluated for 30 minutes. The formula met the conditions of classification as outlined in ASTME-2768-11. For the initial 10 minute test period, the test specimen had a flame spread index less, than or equal to 25 and the flame front did not progress more than 10.5 feet beyond the centerline of the burners at any time during the thirty minute test period.

Environmental Consulting conducted an evaluation of wood treated with the formula to determine if it would pose an environmental or health treat. Additionally it was tested to define if normal treatment process would render the treated material to be classified as 'hazardous waste' by State or Federal regulatory standards. The laboratory analysis during the test determined that all results were "non-detect" for Volatile Organic Chemicals (VOCs), meaning that there were no VOCs present at concentrations above the laboratory reporting limits. The results showed that the wood products treated with the formulation did not exhibit properties of hazardous waste and do not show any evidence of posing an environmental threat to the structure to which they are applied.

In a preferred embodiment the invention's formula can comprise a quantity of cobalt naphthalene, rosin ester, acetone, 4-chlorobenzotriflouride, zinc borate, borate, polyurethane, water, alumina, and Inconel 718. Additionally in some formulations mineral spirits can also be added. The formula is prepared by the following process. First 1.99 g of rosin ester (resin) is mixed with 43.96 ml of acetone and stirred until the rosin ester is dissolved. The 4-chlorobenzotrifluoride and cobalt naphthalene in mineral spirits is added after that, continuing agitation to the solution needs to occur until all components are mixed. This process is followed by adding borate solution (2.5% in water). The zinc borate is added and the mixture is sonicated for five minutes to confirm that it is fully dissolved. Next approximately 4 to 6 grams of alumina and Inconel 718 powder is added to the mixture. The powder by weight is constituted of approximately 1-2 grams Alumina and 3-4 grams of Inconel 718. Finally, the mixture is added to polyurethane in 33 percent mixture and 67 percent polyurethane proportion to obtain the final formulation. The formulation can contain from 0.30 to 0.50 percent of water. The final formulation creates a homogeneous coating formulation which dries clear after being applied to a surface. The homogeneous coating mixture assists in reducing the amount of smoke from the combustion reaction of the surface and lowers the rate of combustion across the surface to reduce the rate at which flames spread.

In one embodiment the formulation can include the components in the following ranges of amounts: 1-2 grams of Alumina, 3-4 grams of Inconel 718, 0.3-.6 ml of water, 0.5-.7 grams of Cobalt Naphthalene, 1.5-2.5 grams of Rosin Esther, 40-46 ml of Acetone, 8.5-10 grams of 4-Chlorobenzotriflouride, 0.004-0.006 g of Zinc Borate, 0.3-0.6 grams of Borate, 45-50 ml of Polyurethane. As set forth above mineral spirits can also be added to this formulation.

The following is a table representing the approximate amounts of the various components which could be used to make the formula:

TABLE 1

Coating Mixture-Preferred Formula

| Component | Range Amount (g) or (ml) | Approximate Percent by Weight |
|---|---|---|
| Aluminel Alloy or Alumina | 1.5 g | 1.37%. |
| Inconel 718 Alloy Nanoparticles | 3.5 g | 3.2% |
| Water | .438 ml | .40% |
| Cobalt Naphthalene | .66 g | .6% |
| Rosin Ester | 1.99 g | 1.8% |
| Acetone | 43.96 ml | 40.1% |
| 4-Chlorobenzotriflouride | 9.34 g | 8.5% |
| Zinc Borate | 0.0055 g | 0.005% |
| Borate (Borax + Boric Acid) | .5 g | 0.457% |
| Polyurethane* | 47.62 ml | 43.568% |

*Commercially available MINIWAX fast-drying Polyurethane, Clear Gloss

It should be noted that Inconel 718 Nanoparticles (also known as Nanopowder) are nanoscale particles of Inconel 718 (nickel/iron/chromium) alloy ranging from 100 to 200 nanometers (nm) with specific surface area (SSA) in the 30 to 70 m2/g range.

In an alternate embodiment the formula can comprise a quantity of cobalt naphthalene, a quantity of rosin ester, a quantity of water, a quantity of acetone, a quantity of 4-chlorobenzotrifluoride, a quantity of zinc borate, a quantity of borate, a quantity of polyurethane and a quantity of Inconel alloy. The aluminel alloy, the sodium chloride, and the diammonium phosphate provide fire retardant properties to a surface which the present invention is applied. The toluene, the acetone, the mineral spirits, the butanol and the 1-chloro-4-trifluoromethyl are used to clean and allow the aluminel alloy to penetrate the surface which the present invention is applied. The quantity of aluminel alloy, the quantity of water, the quantity of sodium chloride, the quantity of diammonium phosphate, the quantity of toluene, the quantity of acetone, the quantity of mineral spirits, the quantity of n-butanol, and the quantity of 1-chloro-4-trifluoromethyl is combined into a homogenous coating mixture.

In some embodiments of the present invention, the present invention further comprises a quantity of cobalt, a quantity of magnesium, a quantity of molybdenum, and a quantity of phosphorous. The quantity of cobalt, the quantity of magnesium, the quantity of molybdenum, and the quantity of phosphorous are homogenously mixed with the quantity of nickel, the quantity of chromium, the quantity of alumina, and the quantity of silica to form the aluminel alloy. This composition of the aluminel alloy makes the aluminel alloy attractive for high temperature and fire retardant applications as the aluminel alloy retains its strength over a wide temperature range between −70c to 1650c.

TABLE 2

Coating Mixture-Alternate Formula Percentage by Weight

| Component | Approximate percent by volume (vol %) at STP |
|---|---|
| Aluminel Alloy | 18% |
| Water | 23% |
| Sodium Chloride | 9% |
| Diammonium Phosphate | 8% |
| Toluene | 1% |
| Acetone | 35% |
| Mineral Spirits | 1% |
| n-butanol, 1-chloro-4-trifluoromethyl | 5% |

In accordance with Table 1, the quantity of aluminel allow is preferred to be approximately 18% by volume (vol %) of the homogeneous coating mixture at standard temperature and pressure (STP), 0° Celsius and 1 bar of pressure. The quantity of water is preferred to be approximately 23 vol % of the homogeneous coating mixture at STP. The quantity of sodium chloride is preferred to be approximately 9 vol % of the homogeneous coating mixture at STP. The quantity of diammonium phosphate is preferred to be approximately 8 vol % of the homogenous coating mixture at STP. The quantity of toluene is preferred to be approximately 1 vol % of the homogenous coating mixture at STP. The quantity of acetone is preferred to be approximately 35 vol % of the homogenous coating mixture at STP. The quantity of mineral spirits is preferred to be approximately 1 vol % of the homogenous coating mixture at STP. Finally, the quantity of n-butanol and the quantity of 1-chloro-4-trifluoromethyl are preferred to be approximately 5 vol % of the homogenous coating mixture at STP. This composition provides sufficient quantities of aluminel alloy, sodium chloride, and diammonium phosphate to remain affixed to the surface the present invention is applied in order to provide fire retardant properties to the surface. Additionally, this composition allows for sufficient quantities of toluene, acetone, mineral spirits, n-butanol, and 1-chloro-4-trifluoromethyl to clean the applied surface and allow the aluminel alloy, sodium chloride, and diammonium phosphate to penetrate into the applied surface.

The homogeneous coating mixture of the invention in any of the formula embodiments dries clear after being applied to a surface. The homogeneous coating mixture assists in reducing the amount of smoke from the combustion reaction of the surface and lowers the rate of combustion across the surface to reduce the rate at which flames spread. The homogeneous coating mixture is applied to surfaces through traditional painting or spraying methods. The homogeneous coating mixture be distributed evenly across the surface to provide consistent fire prevention properties across the surface. Specific applications of the present invention include, but are not limited to, houses, buildings, telephone poles, utility poles, vehicles, playgrounds, or furniture. Once the present invention is applied to a surface, it remains adhered to the surface in order to significantly decrease the chance for the surface to begin combustion.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A composition for preventing fires comprising a quantity of alumina;
   a quantity nanoscale particles of nickel/iron/chromium alloy ranging from 100-200 nm with specific surface area in the 30 to 70 m²/g range; a quantity of water;
   a quantity of cobalt naphthalene;
   a quantity of rosin ester;
   a quantity of acetone;
   a quantity of 4-chlorobenzotriflouride;
   a quantity of zinc borate;
   a quantity of borate; and
   a quantity of polyurethane;
   all mixed together.

2. The composition of claim 1, applied to a surface of one of the following substrates wood, polymers, metals, fabrics, fiberglass and plastic.

3. The composition of claim 1, which expands when flames and radiant heat have entered the substrate surface.

4. The composition of claim 1, which when applied to a surface of wood, polymer, metal, fabric, fiberglass and plastic absorbs into the surface.

5. The composition of claim 1, applied to surfaces through painting or spraying methods to provide consistent fire prevention properties across the surface.

6. The composition of claim 1, wherein the percentage weight of each of the elements is approximately the following:
   1.37% by weight of alumina;
   3.2% by weight of nanoscale particles of nickel/iron/chromium alloy ranging from 100-200 nm with specific surface area in the 30 to 70 m²/g range;
   0.40% by weight of water;
   0.6% by weight of cobalt naphthalene;
   1.8% by weight of rosin ester;
   401% by weight of acetone;
   8.5% by weight of 4-chlorobenzotriflouride;
   0.005% by weight of zinc borate;
   0.457% by weight of borate; and
   43.568% by weight of polyurethane.

7. The composition of claim 1, which also includes a quantity of Inconel alloy.

8. The composition of claim 1, which also includes a quantity of cobalt, magnesium, molybdenum and phosphorus.

9. A method of manufacturing a formulation to inhibit combustion of a surface of wood, polymer, metal, fabric, fiberglass and plastic comprising the following steps:
   rosin ester is mixed with acetone and stirred until dissolved;
   4-chlorobenzotrifluoride and cobalt naphthalene in mineral spirits is added;
   borate solution is added;
   zinc borate is added and the mixture is sonicated until fully dissolved;
   alumina and nanoscale particles of nickel/iron/chromium alloy ranging from 100-200 nm with specific surface area in the 30 to 70 m²/g range powder is added; and
   polyurethane is added.

10. The method of claim 9, wherein a quantity of cobalt, magnesium, molybdenum and phosphorus is added to the mixture.

\* \* \* \* \*